(12) United States Patent
Miyairi et al.

(10) Patent No.: US 10,279,559 B2
(45) Date of Patent: May 7, 2019

(54) METHOD FOR MANUFACTURING HONEYCOMB STRUCTURE

(71) Applicant: NGK INSULATORS, LTD., Nagoya (JP)

(72) Inventors: Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 350 days.

(21) Appl. No.: 15/198,459

(22) Filed: Jun. 30, 2016

(65) Prior Publication Data

US 2017/0008267 A1 Jan. 12, 2017

(30) Foreign Application Priority Data

Jul. 9, 2015 (JP) .................................. 2015-137924

(51) Int. Cl.
*B32B 37/14* (2006.01)
*B32B 3/12* (2006.01)
*B32B 37/06* (2006.01)
*B29D 99/00* (2010.01)

(52) U.S. Cl.
CPC ............ *B32B 3/12* (2013.01); *B29D 99/0089* (2013.01); *B32B 37/146* (2013.01); *B32B 37/06* (2013.01)

(58) Field of Classification Search
CPC ..... B29D 99/0089; B32B 3/12; B32B 37/146; B32B 37/06
USPC .................. 156/244.11, 242, 244.24, 244.13
See application file for complete search history.

(56) References Cited

U.S. PATENT DOCUMENTS

2001/0036427 A1* 11/2001 Yamada ................ F01N 3/2853
422/179

FOREIGN PATENT DOCUMENTS

| JP | 62-094307 | A1 | 4/1987 |
| JP | 2005-180294 | A1 | 7/2005 |
| JP | 2011-098866 | A1 | 5/2011 |
| JP | 2011098866 | A * | 5/2011 |
| JP | 2012-112621 | A1 | 6/2012 |
| JP | 2012-237295 | A1 | 12/2012 |

* cited by examiner

*Primary Examiner* — Philip C Tucker
*Assistant Examiner* — Jimmy R Smith, Jr.
(74) *Attorney, Agent, or Firm* — Burr & Brown, PLLC

(57) ABSTRACT

The method includes: a formed body forming step of forming each of a plurality of honeycomb-segment formed bodies by extrusion; an aggregate formation step of forming a honeycomb-segment aggregate by applying a fluid bonding material to side faces of the honeycomb-segment formed bodies, and arranging the honeycomb-segment formed bodies so that the side faces are brought into contact with each other; an aggregate shaping step of shaping the honeycomb-segment aggregate by performing a press treatment to the side faces of the honeycomb-segment aggregate; and a drying/firing step of drying and firing the honeycomb-segment aggregate, wherein the aggregate shaping step are performed while keeping the water amount of each of the honeycomb-segment formed bodies to be 30 mass % or more, each of the honeycomb segments has cell density that is 620 cells/cm$^2$ or more, and the press treatment is performed with a contact pressure of 0.005 kg/cm$^2$ or more.

16 Claims, 4 Drawing Sheets

METHOD FOR MANUFACTURING HONEYCOMB STRUCTURE

The present application is an application based on JP 2015-137924 filed on Jul. 9, 2015 with Japan Patent Office, the entire contents of which are incorporated herein by reference.

BACKGROUND OF THE INVENTION

Field of the Invention

The present invention relates to a method for manufacturing a honeycomb structure including a plurality of honeycomb segments each having a partition wall that defines a plurality of cells.

Description of the Related Art

Recently society as a whole has been becoming more and more interested in effective use of energy resources, and so various techniques to reuse energy have been developed on a trial basis. Among them, an energy recycling technique attracts attention because the acquisition rate (energy efficiency) of the energy acquired is high. The energy recycling technique converts heat of high-temperature fluid, such as exhaust gas from automobiles, to acoustic-wave energy by a thermoacoustic effect, and finally outputs such energy in the form of electric power. Various efforts have been made toward the practical use of such a system.

Simply speaking, a thermoacoustic effect is a phenomenon to generate acoustic waves using heat. More specifically, the thermoacoustic effect is a phenomenon to oscillate an acoustic-wave transmitting medium in the thin tube to generate acoustic waves when heat is applied to one end part of a thin tube to form a temperature gradient at the thin tube. Since it is effective to generate acoustic waves using a large number of such thin tubes at one time, a heat/acoustic wave conversion component having a honeycomb structure including a plurality of through-holes (cells) each having a small diameter is often used as a collective form of the thin tubes causing a thermoacoustic effect (see e.g., Patent Documents 1 to 3).

Meanwhile the honeycomb structure itself has been used conventionally often because of its three-dimensional geometry having a large surface area without reference to the thermoacoustic effect. For instance, a typical example is a honeycomb structure to load catalyst for exhaust purification to remove fine particulates from exhaust gas of automobiles. Such a honeycomb structure to load catalyst for exhaust purification is often manufactured by extruding a kneaded material into a honeycomb shape, followed by drying and firing. As the dimensions of a honeycomb structure increase, however, it becomes difficult to perform extrusion of the structure monolithically while keeping the dimensional accuracy, and additionally the difficulty in preparing a die for extrusion also increases. Then, when a honeycomb structure of a relatively large size is to be manufactured, it has been often manufactured by dividing it into a plurality of honeycomb segments, and then by bonding these plurality of honeycomb segments to obtain a desired honeycomb structure.

In a typical method for manufacturing such a segment-type structure, a plurality of honeycomb segments after firing are bonded mutually with a bonding material. This method, however, often leads to weakness at the bonding part between the fired honeycomb segments, and so has a drawback of poor bonding strength of the structure as a whole. As one countermeasure against this drawback, a manufacturing method is proposed, in which a plurality of not-fired honeycomb segments is bonded via a not-fired bonding material that is made of the same material as that of the honeycomb segments, the entire of which is finally fired together (see Patent Documents 4 and 5). In this way, the entire structure is fired together, whereby the bonding between the honeycomb segments can be made stronger, whereby high bonding strength can be realized as compared with a typical method for manufacturing a segment-type structure.

[Patent Document 1] JP-A-2005-180294
[Patent Document 2] JP-A-2012-112621
[Patent Document 3] JP-A-2012-237295
[Patent Document 4] JP-A-2011-98866
[Patent Document 5] JP-A-S62-94307

SUMMARY OF THE INVENTION

In general, since oscillations due to generated acoustic waves are frequently given to a heat/acoustic wave conversion component, the heat/acoustic wave conversion component is required to have high durability against oscillations. To this end, also in the case of manufacturing a segmented-structured heat/acoustic wave conversion component, they may be manufactured using a method as disclosed in Patent Documents 4 and 5 to improve the bonding strength.

Meanwhile as is clear from the descriptions on the thermoacoustic effect in the above, a higher thermoacoustic effect can be exerted from a heat/acoustic wave conversion component having more cells per unit area in the cross section perpendicular to the penetrating direction of the cells, i.e., having higher cell density. In a honeycomb structure manufactured using the methods of Patent Documents 4 and 5, although their honeycomb segments themselves may have high cell density, the honeycomb structure as a whole often have low cell density because of the presence of the bonding layer (layer that is the bonding material applied) between the honeycomb segments.

Therefore when a heat/acoustic wave conversion component having a high thermoacoustic effect is to be manufactured, it is difficult to use a method for manufacturing a segmented-structured honeycomb structure as disclosed in Patent Documents 4 and 5 as it is, and another method for this is required.

Although the above descriptions are about a honeycomb structure in the form of a heat/acoustic wave conversion component as one example, the problem as stated above is common to a segmented-structured honeycomb structure as a whole that is required to have higher cell density.

In view of the above-mentioned circumstances, the present invention aims to provide a method for manufacturing a segmented-structured honeycomb structure having high cell density.

To fulfill the above-mentioned aim, the present invention provides the following method for manufacturing a honeycomb structure.

According to a first aspect of the present invention, the method for manufacturing a honeycomb structure is provided including a plurality of honeycomb segments each having a partition wall that defines a plurality of cells, including: a formed body forming step of monolithically forming each of a plurality of honeycomb-segment formed bodies, which has a partition wall to define a plurality of cells extending from a first end face as one end face to a second end face as the other end face, by extruding a kneaded material into a honeycomb shape; an aggregate formation step of forming a honeycomb-segment aggregate by applying a fluid bonding material to side faces of the plurality of honeycomb-segment formed bodies formed in the formed body forming step, and arranging the plurality of honeycomb-segment formed bodies so that the side faces are brought into contact with each other; an aggregate shaping step of shaping the honeycomb-segment aggregate by performing a press treatment to the side faces of the honeycomb-segment aggregate formed in the aggregate formation step; and a drying/firing step of drying and firing the honeycomb-segment aggregate shaped in the aggregate shaping step, wherein the plurality of honeycomb-segment formed bodies formed in the formed body forming step has a water amount of 30 mass % or more, the aggregate formation step and the aggregate shaping step are performed to form and shape the honeycomb-segment aggregate while keeping the water amount of each of the honeycomb-segment formed bodies to be 30 mass % or more, each of the honeycomb segments making up the honeycomb structure has cell density in a cross section perpendicular to a extending direction of the plurality of cells that is 620 cells/cm$^2$ or more, and in the aggregate shaping step, the press treatment is performed to the side faces of the honeycomb-segment aggregate with a contact pressure of 0.005 kg/cm$^2$ or more.

According to a second aspect of the present invention, the method for manufacturing a honeycomb structure according to the first aspect is provided, wherein the honeycomb structure is a heat/acoustic wave conversion component that includes, as the plurality of honeycomb segments, a plurality of honeycomb segments each of which has a partition wall defining a plurality of cells inside of which is filled with working fluid which oscillates to transmit acoustic waves, and that mutually converts heat exchanged between the partition wall and the working fluid and energy of acoustic waves resulting from oscillations of the working fluid.

According to a third aspect of the present invention, the method for manufacturing a honeycomb structure according to the first or second aspects is provided, wherein in the aggregate shaping step, a press treatment is performed to the side faces of the honeycomb-segment aggregate with a contact pressure of 0.05 kg/cm$^2$ or less.

According to a fourth aspect of the present invention, the method for manufacturing a honeycomb structure according to any one of the first to third aspects is provided, wherein in a plane perpendicular to the extending direction of the plurality of cells, a ratio of an open frontal area in the cross section of the honeycomb structure as a whole to an open frontal area in the cross section of each of the plurality of honeycomb segments is 0.97% or more.

According to a fifth aspect of the present invention, the method for manufacturing a honeycomb structure according to any one of the first to fourth aspects is provided, wherein the drying/firing step includes, after drying of the honeycomb-segment aggregate shaped atm the aggregate shaping step and before firing, determining presence or non-presence of a gap between the plurality of honeycomb-segment formed bodies making up the honeycomb-segment aggregate after drying, and if it is determined that a gap is present, inserting the bonding material into the gap to correct the gap, and then firing the honeycomb-segment aggregate.

According to a sixth aspect of the present invention, the method for manufacturing a honeycomb structure according to any one of the first to fifth aspects is provided, wherein hydraulic diameter HD of each cell in each of the plurality of the honeycomb segments is 0.4 mm or less, where the hydraulic diameter RD is defined as HD=4×S/C, where S denotes an area of a cross section of each cell in a plane perpendicular to the extending direction of the cells and C denotes a perimeter of the cross section.

According to a seventh aspect of the present invention, the method for manufacturing a honeycomb structure according to the sixth aspect is provided, wherein the formed body forming step includes forming the plurality of honeycomb-segment formed bodies by extruding a kneaded material using a first die having a slit of 0.04 mm or more and 0.09 mm or less in width, and extruding the extruded kneaded material using a second die having a slit having a shape corresponding to a shape of the partition wall of each of the plurality of honeycomb-segment formed bodies into a honeycomb shape.

According to an eighth aspect of the present invention, the method for manufacturing a honeycomb structure according to any one of the first to seventh aspects is provided, wherein the bonding material applied in the aggregate formation step is prepared by making a material including the same material as that of the kneaded material that is used for the extrusion of the plurality of honeycomb-segment formed bodies in the formed body forming step, into a slurry form.

According to a ninth aspect of the present invention, the method for manufacturing a honeycomb structure according to any one of the first to eighth aspects is provided, wherein the plurality of honeycomb segments are made of cordierite.

According to a tenth aspect of the present invention, the method for manufacturing a honeycomb structure according to any one of the first to ninth aspects is provided, wherein each of the plurality of honeycomb segments has a cross sectional area in a plane perpendicular to the extending direction of the plurality of cells that is 4 cm$^2$ or more and 50 cm$^2$ or less, and the honeycomb structure as a whole has a cross sectional area in the plane that is 25 cm$^2$ or more and 1,600 cm$^2$ or less.

According to the method for manufacturing a honeycomb structure of the present invention, the honeycomb-segment aggregate is shaped by the press treatment in the state where the water amount of each of the honeycomb-segment formed bodies is 30 mass % or more, meaning that drying is not so advanced. Therefore, even when the honeycomb segments making up the honeycomb-segment aggregate have deformation, such deformation can be easily corrected by the press treatment.

Further, during this press treatment of the method for manufacturing a honeycomb structure of the present invention, a large contact pressure of 0.005 kg/cm$^2$ or more is used. Note here that, if shaping of a honeycomb-segment aggregate is performed to manufacture a conventional segmented-structured honeycomb structure (e.g., see Patent Documents 4 and 5) by the press treatment, only a small contact pressure less than 0.002 kg/cm$^2$ can be used. This is because, if a contact pressure of 0.002 kg/cm$^2$ or more is applied, the partition wall part elongated in the pressurization direction of the honeycomb-segments making up the honeycomb-segment aggregate will generate buckling distortion, so that the honeycomb segments may collapse. On the contrary, since the honeycomb segments of the present invention have high cell density of 620 [cells/cm$^2$] or more that will lead to a high thermoacoustic effect when the present invention is used in the manufacturing of a heat/acoustic wave conversion component, the honeycomb-segment formed bodies also have high cell density. Therefore the honeycomb-segment formed body has higher degree of durability against buckling distortion (buckling strength) than that of the conventional honeycomb-segment formed bodies (e.g., see Patent Documents 4 and 5). In the present invention, a press treatment is performed with a larger contact pressure, taking advantage of such a high buckling strength, and therefore a large effect to correct the deformation in the honeycomb segments by the press treatment can be obtained.

In general, if the deformation of honeycomb segments making up a honeycomb-segment aggregate is not corrected sufficiently, the side faces of the honeycomb segment as the bonding faces with the neighboring honeycomb segments will be curved. In this case, the layer of the bonding material between the honeycomb segment and the neighboring honeycomb segments have to be made thicker so as to suppress deterioration in bonding strength between the honeycomb segments or deterioration in accuracy of the arrangement of the honeycomb segments in the honeycomb structure as the final product, resulting from the curving of the bonding faces.

On the contrary, in the present invention, since the deformation of the honeycomb-segment formed bodies can be corrected enough because of a sufficient water amount and a large contact pressure as stated above, there is less necessity to make the bonding material between the honeycomb-segment formed bodies thick. Then, the layer of the bonding material between the honeycomb-segment formed bodies can be made thin to a minimum level that ensures the sufficient bonding strength. As a result, in the whole of the honeycomb structure which is the final product, it is possible to realize high cell density in such a manner that the high cell density of each honeycomb segment is utilized without influences of the bonding material. In this way, according to the present invention, while high bonding strength can be achieved because a not-fired honeycomb segments after bonding is fired together, a high cell density also can be achieved because of a honeycomb structure with high cell density. Especially when the present invention is applied to the manufacturing of a heat/acoustic wave conversion component, a high thermoacoustic effect will be achieved in such a heat/acoustic wave conversion component.

Note here that, in order to make the layer of the bonding material between the honeycomb-segment formed bodies thin, the present invention has another configuration other than the control of the manufacturing step, such as applying the material as thin as possible, so as to avoid a thick layer of the bonding material. For instance, in the present invention, a fluid bonding material is used as the bonding material, and therefore the bonding material is easily spread thin on the bonding face (on the side faces of the honeycomb-segment formed body) during application. Further, since a high contact pressure is applied in the present invention during the press treatment as stated above, the layer of the bonding material is pressed and is spread widely. In this way, such a high contact pressure leads to another advantageous effect of making the layer of the bonding material thin.

DESCRIPTION OF THE PREFERRED EMBODIMENTS

The following describes embodiments of the present invention, with reference to the drawings. The present invention is not limited to the following embodiments, and is to be understood to include the following embodiments, to which modifications and improvements are added in design as needed based on the ordinary knowledge of a person skilled in the art without departing from the scope of the present invention.

The following describes a segmented-structured honeycomb structure that is required to have high cell density, by way of a segmented-structured heat/acoustic wave conversion component as one example.

Figure 1:
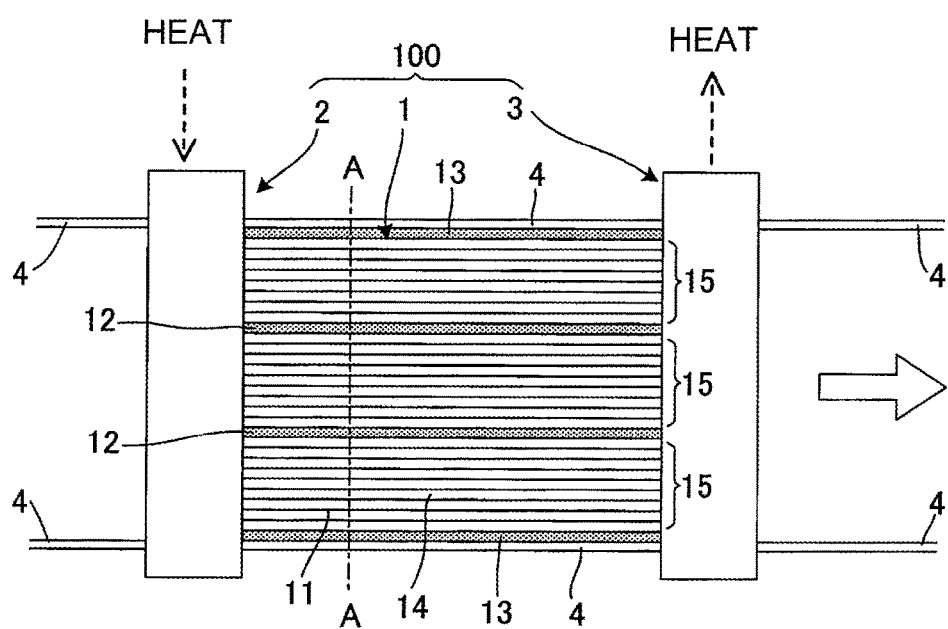
FIG. 1 is a schematic cross-sectional view of a heat/acoustic wave conversion component that is manufactured by one embodiment of a method for manufacturing a honeycomb structure of the present invention.

FIG. 1 is a schematic cross-sectional view of a heat/acoustic wave conversion component 1 that is manufactured by one embodiment of a method for manufacturing a honeycomb structure of the present invention.

The heat/acoustic wave conversion component 1 shown in FIG. 1 is one component making up a heat/acoustic wave conversion unit 100 to convert heat into acoustic-wave energy. This heat/acoustic wave conversion unit 100 includes, in addition to the heat/acoustic wave conversion component 1, a high-temperature side heat exchanger 2 and a low-temperature side heat exchanger 3 that are disposed close to both ends of the heat/acoustic wave conversion component 1.

The high-temperature side heat exchanger 2 has a role of receiving the supply of heat from an external heat source not illustrated (see the dotted arrow close to the high-temperature side heat exchanger 2) and supplying the heat to an end of the heat/acoustic wave conversion component 1 close to the high-temperature side heat exchanger 2. On the other hand, the low-temperature side heat exchanger 3 has a role of absorbing heat from the other end of the heat/acoustic wave conversion component 1 close to the low-temperature side heat exchanger 3 (the end on the other side of the end close to the high-temperature side heat exchanger 2) and releasing the heat to the outside (see the dotted arrow close to the low-temperature side heat exchanger 3). These high-temperature side heat exchanger 2 and low-temperature side heat exchanger 3 yield the state where, between the both ends of the heat/acoustic wave conversion component 1, the end close to the high-temperature side heat exchanger 2 has a relatively higher temperature than at the end close to the low-temperature side heat exchanger 3.

The high-temperature side heat exchanger 2 and the low-temperature side heat exchanger 3 may have a structure of a heat exchanger that is conventionally known in the technical field using a thermoacoustic effect, and the details of such structures does not limit the features of the heat/acoustic wave conversion component 1 described later. In one example of the structures just for information, the high-temperature side heat exchanger 2 may be configured as a heat exchanger that is connected to an exhaust-gas pipe of an engine of an automobile or the like, and defines an exhaust-gas channel surrounding an end of the heat/acoustic wave conversion component 1 to which heat is to be supplied. In the case of this type of the high-temperature side heat exchanger 2, while high-temperature exhaust gas emitted from the engine passes around the end of the heat/acoustic wave conversion component 1 as a heat-supplying target, the heat of the exhaust gas will be transmitted to the end of the heat/acoustic wave conversion component 1. On the other hand, the low-temperature side heat exchanger 3 may be a heat exchanger that is made of a material having good heat conductivity and comes into contact with the other end of the heat/acoustic wave conversion component 1 from which heat is to be absorbed to release the heat to the air. A typical example of the low-temperature side heat exchanger 3 of this type is a heat exchanger having a mesh-laminated structure including a plurality of metal (e.g., copper) mesh plates that are overlapped.

The following describes the heat/acoustic wave conversion component 1.

As shown in FIG. 1, the heat/acoustic wave conversion component 1 has a honeycomb structure, in which a plurality of honeycomb segments 15 are bonded via bonding layers 12, each of the honeycomb segments having a plurality of cells 14 as through-holes like thin tubes that are defined by a partition wall 11. Herein, the word "cell" in the present specification refers to a through-hole only that does not include the partition wall. As shown in FIG. 1, this heat/acoustic wave conversion component 1 is disposed in a transmission tube 4. Each cell 14 has a penetrating direction (an extending direction in which each cell 14 extends) that is the horizontal direction of FIG. 1 (the direction coupling the high-temperature side heat exchanger 2 with low-temperature side heat exchanger 3), and is open at both end faces on the high-temperature side heat exchanger 2 side and on the low-temperature side heat exchanger 3 side and is in communication with the transmission tube 4 via the high-temperature side heat exchanger 2 and the low-temperature side heat exchanger 3.

The transmission tube 4 and each of the cells 14 are filled with working fluid that transmits acoustic waves through oscillations. Although the working fluid may be air, it is preferably gas having low viscosity and being less reactive, such as rare gas, when the transmission tube 4 defines a closed tube and a specific type of the working fluid can be used. Working fluid having high viscosity often generates frictional heat with the inner walls of the transmission tube 4 and each cell 14, and so is disadvantageous in terms of the heat/acoustic wave conversion capability (described later). Reactive working fluid gas produces a chemical change and decreases, and so has a drawback of difficulty to achieve stable heat/acoustic wave conversion capability.

In the heat/acoustic wave conversion component 1, when there is a temperature difference between the both ends due to the high-temperature side heat exchanger 2 and the low-temperature side heat exchanger 3, the working fluid in each cell 14 starts to oscillate in the penetrating direction of the cells 14, and the oscillations are transmitted as acoustic waves outside of the heat/acoustic wave conversion component 1 from the heat/acoustic wave conversion component 1 via the low-temperature side heat exchanger 3 (see the thick arrow in the drawing). Such a phenomenon of the working fluid oscillating in response to a given temperature difference is called self-induced oscillations, and is a conventionally well-known phenomenon that occurs when a temperature gradient is given to a thin tube. A thermoacoustic effect refers to generation of acoustic waves due to the self-induced oscillation of working fluid resulting from heat.

The following briefly describes this self-induced oscillation (a lot of documents describe the details, and Patent Document 3 also provides the detailed descriptions thereon, for example).

When giving a temperature gradient to a thin tube, then working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillation of the working fluid in the elongation direction of the tube. Simply speaking, such motion of the working fluid can said to be the motion to convey heat so as to alleviate (weaken) the temperature gradient at the wall surface. As can be clear from this description as well, such a phenomenon occurs only when the tube is so thin that the thermal effects from the wall surface are large on the working fluid inside. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as $HD=4\times S/C$, where S denotes the cross-sectional area of the tube and C denotes the perimeter of this section.

Since each of the cells 14 in the heat/acoustic wave conversion component 1 as stated above has a sufficient small hydraulic diameter HD to generate self-induced oscillation, self-induced oscillation occurs due to the temperature difference as stated above at the both end faces of the heat/acoustic wave conversion component 1. Due to this self-induced oscillation, acoustic waves are generated in each of the cells 14, which travel toward the end face on the low-temperature side heat exchanger 3 side. The generated acoustic waves travel through the transmission tube 4 as shown in the thick arrow in the drawing, and the energy of these acoustic waves can be converted into electricity by an energy-conversion mechanism, such as a microphone, not illustrated. As a result, heat given to the high-temperature side heat exchanger 2 (e.g., heat from the exhaust gas) can be effectively used in the form of electricity.

The above describes the case where heat is given to the heat/acoustic wave conversion unit 100 to generate acoustic-wave energy as one example. Instead, acoustic-wave energy can be converted into cold heat as well using a heat/acoustic wave conversion unit 100 having a similar structure. Such energy conversion into cold heat is based on a mechanism that is the inverse of the mechanism (a temperature gradient is generated in through-holes due to acoustic waves) of the thermoacoustic effect as stated above (acoustic waves are generated from a temperature gradient in through-holes). For instance, when acoustic waves enter the heat/acoustic wave conversion component 1 from the high-temperature side heat exchanger 2 in the state where the high-temperature side heat exchanger 2 does not receive any supply of heat, and the low-temperature side heat exchanger 3 is at a temperature the ambient temperature or less, heat will be given to the transmitted acoustic waves so as to generate a temperature gradient in the heat/acoustic wave conversion component 1. As a result, a low-temperature state will be produced such that the temperature is lower at the high-temperature side heat exchanger 2 than at the low-temperature side heat exchanger 3. Then, heat cold in this low-temperature state can be taken out through a medium, such as water (e.g., taken out as cold heat of cooling water).

Then the following describes the structure of the heat/acoustic wave conversion component 1 in more details.

Figure 2:
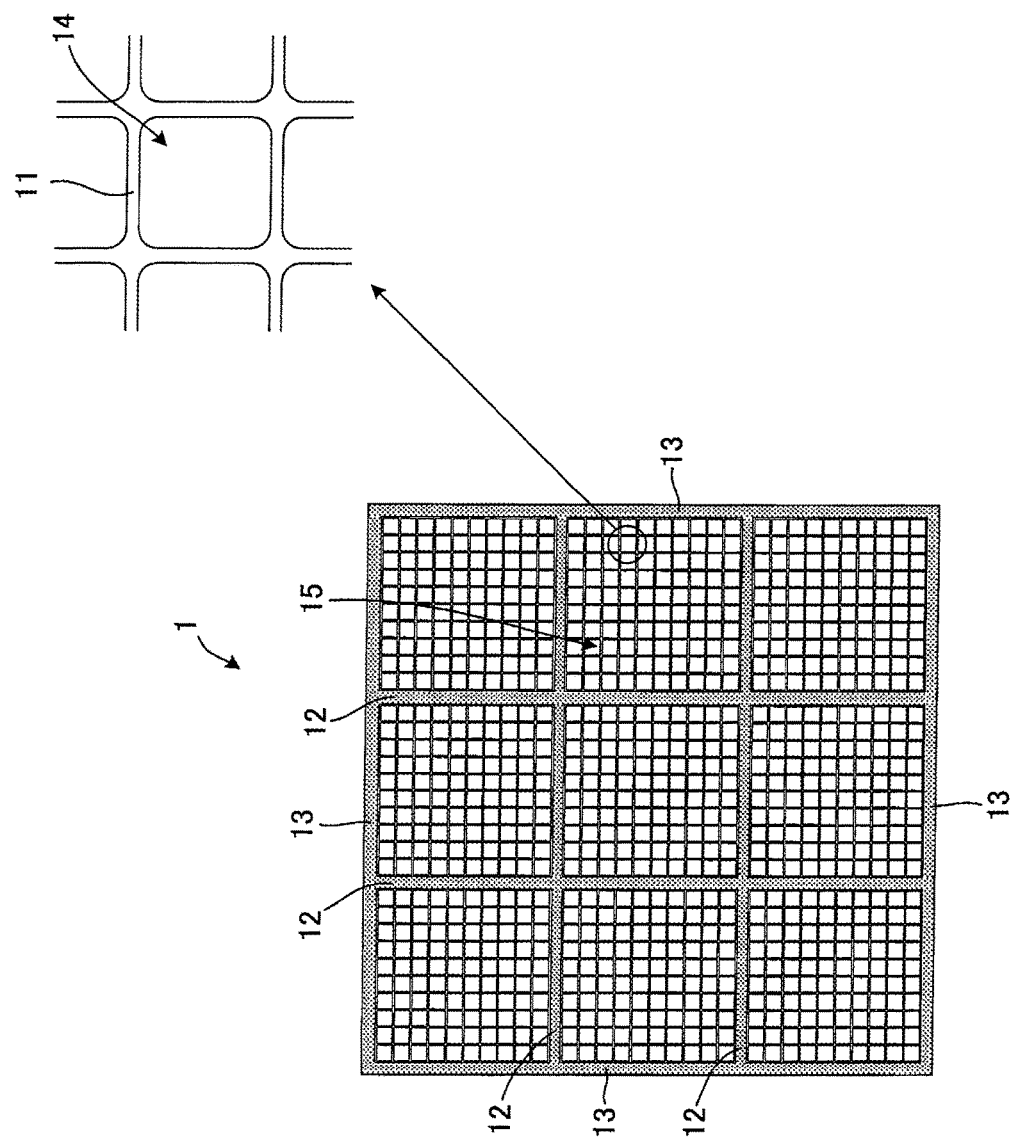
FIG. 2 is a cross-sectional view of the heat/acoustic wave conversion component 1 taken along the line AA in FIG. 1.

FIG. 2 is a cross-sectional view of the heat/acoustic wave conversion component 1 taken along the line AA in FIG. 1.

As shown in FIG. 2, the heat/acoustic wave conversion component 1 includes a plurality of honeycomb segments 15 that are mutually bonded via bonding layers 12, each of the honeycomb segments having a plurality of cells 14 that are defined by a partition wall 11. These bonding layers 12 are obtained by firing of a bonding material 12A (see FIG. 5, for example) used in a manufacturing method described later. In the present invention, a circumferential wall may be disposed so as to surround the aggregate of the plurality of honeycomb segments 15, and FIG. 2 (see also FIG. 1) shows a circumferential wall 13 surrounding the aggregate of the honeycomb segments 15 as such an example. The circumferential wall 13 may be made of a material that is the same as the material of the partition wall 11.

It should be noted that, for a larger thermoacoustic effect, it is advantageous to form as many as possible of the cells 14 that are thin through-holes generating self-induced oscillation. In other words, it is advantageous to have large cell density at the end face of the heat/acoustic wave conversion component 1. The heat/acoustic wave conversion component 1 has high cell density of 620 [cells/cm$^2$] or more at each end face, whereby a sufficient thermoacoustic effect can be exerted. Conversely, if the cell density is less than 620 [cells/cm$^2$], then the number of cells contributing to the thermoacoustic effect is too small, and so a very large thermoacoustic effect cannot be achieved therefrom. For cell density of 620 [cells/cm$^2$] or more, cell density of 770 [cells/cm$^2$] is more preferable.

In general, hydraulic diameter HD of the through-holes is one of the important factors to generate acoustic waves from self-induced oscillations as stated above, and so the hydraulic diameter HD of the cells 14 in the heat/acoustic wave conversion component 1 is preferably 0.4 mm or less. Such cells having a very small hydraulic diameter HD of 0.4 mm or less that is formed with high density can realize a large thermoacoustic effect from the heat/acoustic wave conversion component 1. Conversely if the hydraulic diameter HD is larger than 0.4 mm, a small thermoacoustic effect only can be obtained because the self-induced oscillation is weak.

Further the heat/acoustic wave conversion component 1 preferably has a ratio of the open frontal area in the cross section of the heat/acoustic wave conversion component 1 as a whole to the open frontal area in the cross section of each of the plurality of honeycomb segments 15 in a plane perpendicular of the penetrating direction of the plurality of cells 14 as shown in FIG. 2 that is 0.97% or more. Herein, such a ratio of the open frontal area in each of the honeycomb segments 15 being 0.97 or more means that the heat/acoustic wave conversion component 1 also can have high cell density (in other words, large open frontal area) due to high cell density (in other words, large open frontal area) of each of the honeycomb segments 15 as stated above. If the ratio of the open frontal area is less than 0.97, any part of the bonding layers 12 (when the circumferential wall 13 is provided, the bonding layers 12 and the circumferential wall 13) is thick, and therefore the number of cells contributing to a thermoacoustic effect is small, and a very large thermoacoustic effect cannot be achieved therefrom. For the ratio of the open frontal area of 0.97 or more, the ratio of the open frontal area of 0.99 or more is more preferable.

The open frontal area can be obtained as follows. An image of a cross section perpendicular to the penetrating direction is taken by a microscope, and the material-part area S1 and the gap-part area S2 are determined from the taken image of the cross section. Then the open frontal area can be obtained as S2/(S1+S2) based on S1 and S2. Herein, when there are pores in the partition wall, the area of the pores in the taken image should be included in the material-part area S1.

In the heat/acoustic wave conversion component 1, the cells preferably have a cross-sectional shape that is perpendicular to the penetrating direction of the cells 14 such that it is a polygonal shape whose corners are curved, and the corners of the shape preferably have a curvature radius of 0.02 mm or more and 0.1 mm or less. FIG. 2 shows an example of the shape of the cells 14 in the enlarged view on the upper right side, where the quadrangles shown have curved corners, and have a curvature radius of 0.02 mm or more and 0.1 mm or less. Such a curvature radius of 0.02 mm or more means a gently curved shape, and so it can sufficiently resist an impact acting to crush the cells 14. This is based on the same reason for the shape of a hole such as a tunnel, i.e., a rounded shape is more resistant to an external force from the surrounding than an angular shape. If the curved part is too large, then the partition wall 11 close to the corners of the cells 14 is thick, and accordingly the open frontal area decreases, and the thermoacoustic effect obtained can be reduced. Then, the curvature radius is set at 0.1 mm or less, whereby a high thermoacoustic effect also can be kept at the same time.

The curvature radius at the corners of the cells 14 can be measured by taking an enlarged photo in a cross section perpendicular to the penetrating direction of the cells 14 and based on the cross-sectional shapes of the cells 14.

The cells 14 may have a shape in a plane perpendicular to the penetrating direction of the cells 14 that are various polygons, such as triangles, quadrangles, pentagons and hexagons as well as ellipses (including a perfect circle shape), where triangles, quadrangles and hexagons and their combinations are preferable, and triangles and quadrangle are especially preferable. Triangles and quadrangles are especially preferable because they are the most suitable among various polygonal shapes and elliptical cell shapes for the arrangement of a lot of cells while minimizing the thickness of the partition wall.

In FIG. 2, since the cells 14 are quadrangles as one example of the shape, the honeycomb segments 15 accordingly are quadrangles. Note here that the honeycomb segments 15 may have various shapes corresponding to the shape of the cells 14 as long as the cells 14 can be arranged without making the partition wall thick. For instance, when the cells 14 are squares, the honeycomb segments 15 may be oblongs as well as squares. In this way, the honeycomb segments 15 of the present invention may have various shapes, and polygonal shapes are preferable because they facilitate a press treatment described later. Among the polygonal shapes, triangles and quadrangles are especially preferable because they are easily arranged regularly.

Preferably in the heat/acoustic wave conversion component 1, each of the plurality of honeycomb segments 15 in the plane perpendicular to the penetrating direction of the plurality of cells 14 has a cross-sectional area of 4 cm$^2$ or more and 50 cm$^2$ or less, and the heat/acoustic wave conversion component 1 as a whole in this plane has a cross-sectional area of 25 cm$^2$ or more and 1,600 cm$^2$ or less. In general, when the honeycomb structure having a cross-sectional area of 25 cm$^2$ or more as whole is to be manufactured, it is difficult to perform extrusion monolithically while keeping the dimensional accuracy, and additionally the difficulty in preparing a die for extrusion also increases. In such a case, the honeycomb structure is desirably manufactured by dividing it into honeycomb segments each having a cross-sectional area of 4 cm² or more and 50 cm² or less. Herein, a honeycomb structure exceeding 1,600 cm² is too large in dimensions for loading of catalyst for exhaust purification or for achieving a thermoacoustic effect, and an apparatus including such a honeycomb structure will increase in size unfavorably. Then, when the heat/acoustic wave conversion component 1 is manufactured so that each honeycomb segments 15 and the heat/acoustic wave conversion component 1 as a whole have their cross-sectional areas belonging to the preferable numerical ranges as stated above, a segment-type manufacturing method is the most effective therefor.

Let that L denotes the length between both end faces of the heat/acoustic wave conversion component 1, the heat/acoustic wave conversion component 1 has a ratio HD/L of the hydraulic diameter HD as stated above to this length L that is 0.005 or more and less than 0.02. If HD/L is less than 0.005, the heat/acoustic wave conversion component 1 is too long as compared with the hydraulic diameter HD. Then working fluid in each cell 14 of the heat/acoustic wave conversion component 1 will be less affected from a temperature difference between both ends of the heat/acoustic wave conversion component. In this case, heat exchange between the working fluid in each cell 14 and the partition wall 11 is not sufficient and so a sufficient thermoacoustic effect cannot be obtained. On the other hand, if HD/L is 0.02 or more, then heat/acoustic wave conversion component 1 is too short as compared with the hydraulic diameter HD. In this case, heat is transmitted through the partition wall 11 from the high-temperature side heat exchanger 2 side to the low-temperature side heat exchanger 3 side in the heat/acoustic wave conversion component 1 before heat exchange between the working fluid in each cell 14 and the partition wall 11 becomes sufficient. As a result, a sufficient thermoacoustic effect still cannot be obtained. Then, the heat/acoustic wave conversion component 1 is configured to have the ratio HD/L of 0.005 or more and less than 0.02, and so heat exchange between the working fluid in each cell 14 and the partition wall 11 is sufficient. As a result, the heat/acoustic wave conversion component 1 can have a sufficient thermoacoustic effect.

Preferably each of the honeycomb segments 15 in the heat/acoustic wave conversion component 1, especially the partition walls 11 in the honeycomb segment 15 is made of a material having a ratio of thermal expansion at 20 to 800° C. that is 6 ppm/K or less. One of the methods to realize such a low state of the ratio of thermal expansion is using "honeycomb segments made of cordierite" that has a low ratio of thermal expansion among the ceramic materials as the material of the honeycomb segments 15. Herein a "honeycomb structure made of cordierite" refers to a honeycomb structure that is manufactured using, as a ceramic raw material to manufacture the honeycomb structure, a cordierite forming raw material that is formulated to have a chemical composition in the range of 42 to 56 mass % of silica, 30 to 45 mass % of alumina and 12 to 16 mass % of magnesia, and forms cordierite after firing.

The ratio of thermal expansion can be measured, for example, by cutting out, from the heat/acoustic wave conversion component 1, a test piece that has a length of 10 mm or more along the penetrating direction of the cells 14 and having an area of a cross section including this penetrating direction as well as the direction orthogonal to the penetrating direction that is 4 mm² or more and 100 mm² or less, and measuring the ratio of thermal expansion of this test piece in the penetrating direction using a differential thermal dilatometer using quartz as a reference comparative sample.

Such a ratio of thermal expansion at 20 to 800° C. of 6 ppm/K or less of the materials making up the partition wall 11 can suppress damage on the heat/acoustic wave conversion component 1 when a temperature difference occurs at the both ends. A ratio of thermal expansion of 4 ppm/K or less is more preferable in the ratio of thermal expansion of 6 ppm/K or less.

That is the detailed descriptions on the configuration of the heat/acoustic wave conversion component 1 of FIGS. 1 and 2.

The following describes a method for manufacturing the heat/acoustic wave conversion component 1 of FIGS. 1 and 2 that is one embodiment of the present invention.

Figure 3:
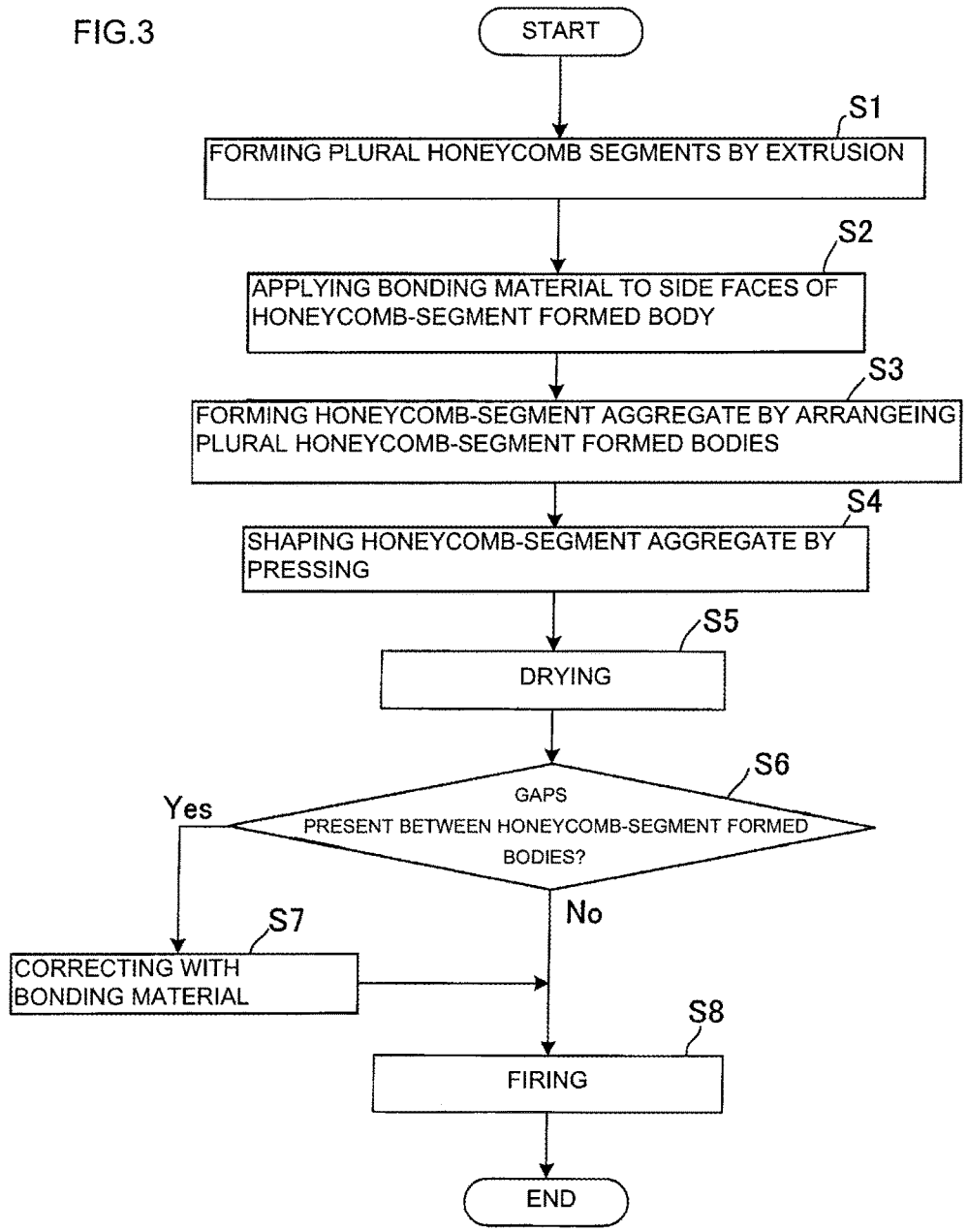
FIG. 3 is a flowchart showing the method for manufacturing the heat/acoustic wave conversion component of FIGS. 1 and 2.

FIG. 3 is a flowchart showing the method for manufacturing the heat/acoustic wave conversion component 1 of FIGS. 1 and 2.

In this manufacturing method, a kneaded material is extruded firstly into a honeycomb shape, whereby each of a plurality of honeycomb-segment formed bodies is formed monolithically (Step S1). This Step S1 corresponds to one example of a formed body forming step of the present invention.

Figure 4:
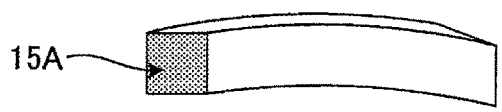
FIG. 4 shows one honeycomb-segment formed body.

FIG. 4 shows one honeycomb-segment formed body 15A.

A honeycomb-segment formed body 15A becomes a honeycomb segment 15 in FIGS. 1 and 2 after the completion of the heat/acoustic wave conversion component 1, and has a shape similar to that of the honeycomb segment 15. That is, the honeycomb-segment formed body 15A also has a partition wall to define a plurality of cells penetrating from a first end face as one end face to a second end face as the other end face. Herein, the water amount of each honeycomb-segment formed body 15A is 30 mass % or more. In this way, the honeycomb-segment formed body 15A immediately after extrusion contains water a lot and is flexible, and therefore deformation may occur to some extent due to its own weight or the like as shown in FIG. 4.

The following more specifically describes manufacturing of the honeycomb-segment formed body 15A as well as the details of the materials thereof. The following describes the case where each of the honeycomb segments 15 is made of cordierite as one example.

Firstly, binder, dispersing agent, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. As stated above, the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together. The content of the binder is preferably 2 to 20 mass % with reference to the forming raw material as a whole.

The content (amount) of water is preferably 30 mass % or more with reference to the forming raw material as a whole as stated above. Herein if the water amount exceeds 45 mass %, the honeycomb-segment formed body 15A will have very poor shape-holding property, and therefore the water amount is preferably 30 to 45 mass %.

Examples of the dispersing agent used include ethylene glycol, dextrin, fatty acid soap, and polyalcohol. They may be used alone or in combination of two or more types. The content of the dispersing agent is preferably 5 mass % or less with reference to the forming raw material as a whole.

Examples of the pore former used include starch, foamable resin, water absorbable resin or silica gel.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb-segment formed body 15A is formed, including a partition wall defining a plurality of cells. For the extrusion, a die having a shape in accordance with the features of the structure, such as the hydraulic diameter and the shape of the cells 14, and the cell density of the honeycomb segment 15 and the shape of the honeycomb segment 15 as stated above is preferably used. A preferable material of the die is cemented carbide having wear resistance. Values of the hydraulic diameter or the like of each cell 14 of the honeycomb-segment formed body 15A are determined preferably while considering contraction generated during drying and firing described later as well.

Herein, if a honeycomb-segment formed body 15A to achieve a honeycomb segment 15 having high cell density and a very small hydraulic diameter of each cell 14 as stated above for a larger thermoacoustic effect is extruded by simply using a conventional extrusion method as it is used for a conventional honeycomb structure 15 to load catalyst for exhaust purification, which is free from such constraints, then the following two problems will occur.

The first problem is that, during extrusion, kneaded material extruded at a high temperature adheres to the holes in a forming die, which easily generates clogging. This problem is mentioned by the above-stated Patent Document, JP-A-2012-237295 also in paragraph [0021].

The second problem is that a die used for a honeycomb segment having high cell density and small hydraulic diameter of each cell as in the honeycomb segments 15 as stated above inevitably includes a very thin and minute part (typically a part of about 0.3 mm in thickness). Then, such a minute part often is damaged (e.g., is torn) by viscous friction during kneaded material extrusion.

On the contrary, the manufacturing method of the heat/acoustic wave conversion component 1 has the following configuration to solve these two problems.

For the first problem, prior to the extrusion using a die (hereinafter called a real die) suitable for the honeycomb segment 15 having high cell density and small hydraulic diameter of each cell 14, a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb-segment formed body 15A, and means a slit width of the die. Each slit of the die is a hole to discharge the kneaded material and is to determine the shape of each partition wall part of the honeycomb segments 15 to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed. Herein, the dummy die as stated above corresponds to one example of a "first die" of the present invention, and the real die as stated above corresponds to one example of a "second die" of the present invention.

The second problem is solved by reducing viscosity of the kneaded material used for extrusion greatly as compared with the viscosity of a kneaded material used for a conventional honeycomb structure to load catalyst for exhaust purification so as to reduce the viscous friction. Specifically, while the water amount in a kneaded material used to manufacture a conventional honeycomb segment for a honeycomb structure to load catalyst for exhaust purification does not exceed 27 mass % usually, the kneaded material after extrusion using the dummy die as stated above has the water amount of 30 mass % or more as stated above. In this way, the manufacturing method of the heat/acoustic wave conversion component 1 avoids the second problem because the water amount of the kneaded material used for extrusion is more and the viscosity of the kneaded material is smaller than those in conventional ones. In general, if the water amount is 30 mass % or more, there is a problem to keep the shape of the honeycomb-segment formed body. However, the manufacturing method of the heat/acoustic wave conversion component 1 includes a shaping step performed separately as described later, and this is not a big problem.

Referring back to FIG. 3, the descriptions on the subsequent processing for the honeycomb-segment formed body 15A obtained through extrusion are continued in the following.

Next, a fluid bonding material is applied to side faces of the honeycomb-segment formed body 15A (Step S2 in FIG. 3). Herein, the "fluid bonding material" used may be a bonding material in a solution form or a bonding material including a solid being suspended in solution. Among such bonding materials, a slurry-form bonding material is preferable because it is easily applied with a uniform thickness. Hereinafter, a slurry-form bonding material may be called "bonding-material slurry". Herein the bonding-material slurry preferably is a slurry-form material including a material that is the same material as that of the kneaded material of the honeycomb-segment formed body 15A, and is the same material in a slurry form more preferably.

Figure 5:
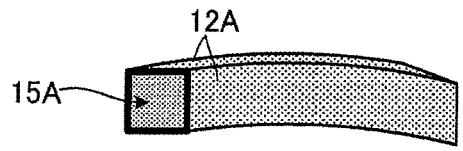
FIG. 5 shows the honeycomb-segment formed body of FIG. 4, on side faces of which a fluid bonding material is applied.

FIG. 5 shows the honeycomb-segment formed body 15A of FIG. 4, on side faces of which a fluid bonding material is applied.

As shown in FIG. 5, a fluid bonding material 12A is applied to the side faces of the honeycomb-segment formed body 15A of FIG. 4. At this time, due to the fluidity of the fluid bonding material 12A, the fluid bonding material 12A is easily spread thin on the side faces of the honeycomb-segment formed body 15A as the bonding faces. Therefore the bonding material layer will not be thick after the application of the material on the side faces.

Referring back to FIG. 3, the descriptions are continued.

Next, a plurality of the honeycomb-segment formed bodies 15A are arranged so that the side faces of the honeycomb-segment formed bodies 15A are brought into contact with each other, and this arrangement yields a honeycomb-segment aggregate (Step S3 in FIG. 3). Step S2 as stated above in combination with this Step S3 corresponds to one example of an aggregate formation step of the present invention. Herein, Step S2 and this Step S3 are performed in the state keeping the water amount of each honeycomb-segment formed body 15A to be 30 mass % or more.

Figure 6:
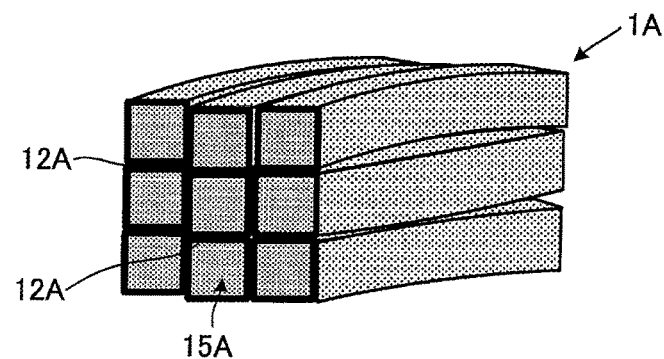
FIG. 6 shows a honeycomb-segment aggregate, obtained by arranging the honeycomb-segment formed bodies, on the side faces of which a bonding material has been applied, so that their side faces are brought into contact with each other.

FIG. 6 shows a honeycomb-segment aggregate 1A, obtained by arranging the honeycomb-segment formed bodies 15A, on the side faces of which the fluid bonding material 12A has been applied, so that their side faces are brought into contact with each other.

Due to the deformation of the honeycomb-segment formed body 15A as stated above at Step S1 in FIG. 3, the honeycomb-segment aggregate 1A including the arrangement of the plurality of honeycomb-segment formed bodies 15A also have gaps between the honeycomb-segment formed bodies 15A as shown in FIG. 6, and the side faces of the honeycomb-segment aggregate 1A is not so flat.

Referring back to FIG. 3, the descriptions are continued.

Next, a press treatment is performed to the side faces of the honeycomb-segment aggregate shown in FIG. 6 so as to shape the honeycomb-segment aggregate 1A (Step S4 in FIG. 3). This Step S4 corresponds to one example of an aggregate shaping step of the present invention.

Figure 7:
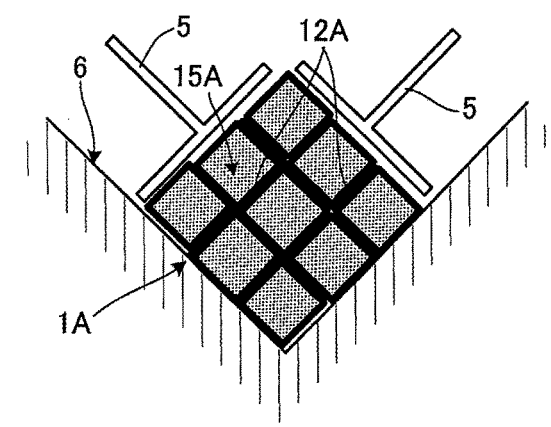
FIG. 7 schematically shows one example of the press treatment to the side faces of the honeycomb-segment aggregate shown in FIG. 6.

FIG. 7 schematically shows one example of the press treatment to the side faces of the honeycomb-segment aggregate 1A shown in FIG. 6.

In the example of FIG. 7, one of the corners of the honeycomb-segment aggregate 1A in FIG. 6 is fitted into a right-angled corner of a mount 6 having two floors forming the right angle, and then the press treatment is performed to the honeycomb-segment aggregate 1A. For instance, pressure is applied to two side faces of the honeycomb-segment aggregate 1A disposed on the mount 6 that do not come into contact with the two floors of the mount 6 by two pressurizing members 5 (FIG. 7 shows their T-letter shape cross section only) each having a flat-shaped pressurization part, respectively.

The press treatment performed using the mount 6 having two floors forming a right angle is explained here as an example of the press treatment, but the present invention is not limited to this example. Pressurization in various forms can be used as long as pressure can be applied to side faces of a honeycomb-segment aggregate. For instance, in a simplest pressurization form, the honeycomb-segment aggregate 1A of FIG. 6 may be placed on a flat floor so as to bring one of the side faces of the honeycomb-segment aggregate 1A into contact with the flat floor, and then pressure may be applied to the remaining three side faces.

Figure 8:
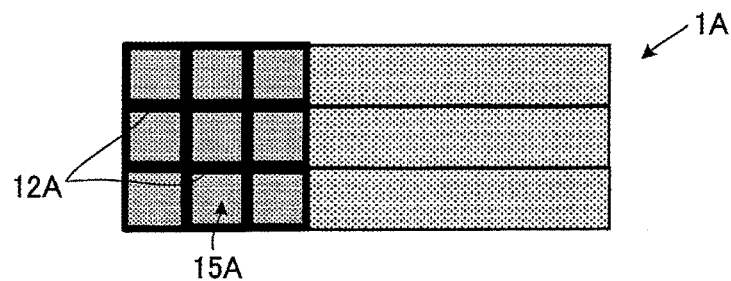
FIG. 8 shows the state of the honeycomb-segment aggregate after the press treatment in FIG. 7.

FIG. 8 shows the state of the honeycomb-segment aggregate 1A after the press treatment at Step S4 in FIG. 3.

As a result of the press treatment at Step S4 of FIG. 3, as shown in FIG. 8, most of the gaps between the honeycomb-segment formed bodies 15A are removed, so that the side faces of the honeycomb-segment aggregate 1A become flat.

Herein, similarly to Step S2 and Step S3, the press treatment at Step S4 also is performed in the state keeping the water amount of each honeycomb-segment formed body 15A to be 30 mass % or more.

One of the methods to keep the water amount to be 30 mass % or more in these steps as stated above includes shortening the processing time from the formation of a kneaded material at Step S1 to the press treatment at Step S4 as stated above (e.g., within a few hours). Another method includes performing these steps under a not-high temperature environment (e.g., temperature environment of ambient temperature or lower). One method to actually check whether the water amount can be kept to be 30 mass % or more includes: finding the mass of the honeycomb-segment formed bodies 15A immediately after forming, and the overall mass of the used fluid bonding material 12A (a difference obtained by subtracting the mass of the entire fluid bonding material 12A that is not used and left, from the overall mass of the prepared fluid bonding material 12A); and comparing the sum of them with the mass of the honeycomb-segment aggregate 1A after press treatment. In this case, a decrease in the mass can be considered as the decreased amount (evaporated amount) of the water. If the water amount obtained when this decreased amount is subtracted from the original water amount is still 30 mass % or more, then it can be estimated that the water amount of each honeycomb-segment formed body 15A can be kept at 30 mass % or more during the steps from Step S1 to Step S4. Another method includes: forming one more honeycomb-segment formed body 15A for checking of a decreased water amount, leaving the honeycomb-segment formed body 15A for checking of a decreased water amount under the same environment as those of Steps S1 to S4 during the steps of S1 to S4, and checking the decreased water amount of the honeycomb-segment formed body 15A for checking of a decreased water amount. In this case, a decrease in mass, obtained by comparing the mass of this honeycomb-segment formed body 15A for checking of a decreased water amount at the time when the press treatment as stated above is finished with the mass of the honeycomb-segment formed body 15A for checking of a decreased water amount at the time when the honeycomb-segment formed body 15A for checking of a decreased water amount is manufactured, can be considered as the decreased amount (evaporated amount) of the water. If the water amount obtained when this decreased amount is subtracted from the original water amount is still 30 mass % or more, then it can be estimated that the water amount of each honeycomb-segment formed body 15A making up the honeycomb-segment aggregate 1A can be kept at 30 mass % or more during the steps from Step S1 to Step S4.

The state of keeping the water amount at 30 mass % or more means that drying is not so advanced, and each honeycomb-segment formed body 15A still has sufficient flexibility. Therefore, even when the honeycomb-segment formed bodies 15A making up the honeycomb-segment aggregate 1A still have deformation, such deformation can be easily corrected by the press treatment as shown in FIG. 7.

Further, during this press treatment, the honeycomb-segment aggregate is shaped under a large contact pressure of $0.005$ kg/cm$^2$ or more.

Note here that when a conventional segmented-structured honeycomb structure (e.g., see Patent Documents 4 and 5) is manufactured, only a small contact pressure less than $0.002$ kg/cm$^2$ can be used even if shaping of a not-fired honeycomb-segment aggregate by the press treatment is performed. This is because, if a contact pressure of $0.002$ kg/cm$^2$ or more is applied, the partition wall part elongated in the pressurization direction of the not-fired honeycomb-segment formed bodies making up the honeycomb-segment aggregate will generate buckling distortion, so that the honeycomb-segment formed bodies may collapse.

On the contrary, the honeycomb-segment formed body 15A in FIG. 6 has high cell density because it corresponds to the honeycomb segments 15 in FIG. 1 having high cell density of 620 [cells/cm$^2$] or more to exert a high thermoacoustic effect. Therefore the honeycomb-segment formed body 15A has higher degree of durability against buckling distortion (buckling strength) than that of the conventional honeycomb-segment formed bodies (e.g., see Patent Documents 4 and 5). In the manufacturing method of FIG. 3, a press treatment is performed with a large contact pressure of 0.005 kg/cm$^2$ or more, taking advantage of such a high buckling strength, and therefore a large effect to correct the deformation in the honeycomb-segment formed body 15A by the press treatment can be obtained. If the contact pressure exceeds 0.05 kg/cm$^2$, since such a contact pressure is too large, even a honeycomb-segment formed body 15A corresponding to the honeycomb segments 15 having cell density of 620 [cells/cm$^2$] or more may collapse depending the cell density. Therefore, a preferable contact pressure during the press treatment is 0.005 kg/cm$^2$ or more and 0.05 kg/cm$^2$ or less. Note here that, since higher cell density means higher degree of durability against contact pressure, if a honeycomb-segment formed body 15A corresponds to a honeycomb segments 15 having high cell density greatly exceeding 620 [cells/cm$^2$], a contact pressure exceeding 0.05 kg/cm$^2$ may be applied.

In general, if the deformation of a honeycomb-segment formed body making up a honeycomb-segment aggregate is not corrected sufficiently, the side faces of the honeycomb-segment formed body as the bonding faces with the neighboring honeycomb-segment formed bodies will be curved. In this case, the layer of the bonding material between the honeycomb-segment formed body and the neighboring honeycomb-segment formed bodies have to be made thicker so as to suppress deterioration in bonding strength between the honeycomb segments or deterioration in accuracy of the arrangement of the honeycomb segments in the honeycomb structure as the final product, resulting from the curving of the bonding faces.

On the contrary, according to the manufacturing method of FIG. 3, since the deformation of the honeycomb-segment formed bodies 15A can be corrected enough because of a sufficient water amount and a large contact pressure, there is less necessity to make the bonding material between the honeycomb-segment formed bodies 15A thick. Then, the layer of the bonding material between the honeycomb-segment formed bodies 15A can be made thin to a minimum level that ensures the sufficient bonding strength. As a result, according to the manufacturing method of FIG. 3, in the whole of the honeycomb structure of the heat/acoustic wave conversion component 1 which is the final product, it is possible to realize high cell density in such a manner that the high cell density of each honeycomb segment is utilized without influences of the bonding material. In this way, according to the manufacturing method of FIG. 3, while high bonding strength can be achieved because a not-fired honeycomb-segment aggregate 1A after bonding is fired together, a high thermoacoustic effect also can be achieved because of a honeycomb structure with high cell density.

Herein the degree about how the cell density of each honeycomb segment can be reflected in the whole of the honeycomb structure of the heat/acoustic wave conversion component 1 can be evaluated by a ratio of the open frontal area of the cross section in the heat/acoustic wave conversion component 1 as a whole to the open frontal area of the cross section of each honeycomb segment 15 in a plane perpendicular to the penetrating direction of the cells 14. Specifically, as described above, the heat/acoustic wave conversion component 1 in FIGS. 1 and 2 has such a ratio of 0.97 or more, and therefore a state very close to the value "1" can be achieved.

Referring back to FIG. 3, the descriptions are continued.

Next, the honeycomb-segment aggregate 1A after shaping is dried (Step S5 in FIG. 3). A method for drying is not limited especially, and exemplary methods include an electromagnetic wave heating method such as microwave heat-drying and high-frequency induction heating drying and an external heating method such as hot air drying and super-heated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method is induction heating drying, and a preferable external heating method is hot air drying.

Next, presence or non-presence of gaps between the plurality of honeycomb-segment formed bodies 15A making up the honeycomb-segment aggregate 1A after drying is determined (Step S6 in FIG. 3). This determination may be performed for example by observing the honeycomb-segment aggregate 1A visually or by observing a taken enlarged image of the honeycomb-segment aggregate 1A. Alternatively, light such as laser light is applied to the honeycomb-segment aggregate 1A while changing the irradiated position on the honeycomb-segment aggregate 1A, and a change in the reflected light is analyzed by an instrument, whereby presence or non-presence of the gaps may be determined. If it is determined that a gap is present (Yes at Step S6 in FIG. 3), the bonding material as stated above is inserted to the gap to fill the gap for correction (Step S7 in FIG. 3). Then, the honeycomb-segment aggregate 1A after the correction is fired (Step S8 in FIG. 3). On the contrary, if it is determined that no gap is present (No at Step S6 in FIG. 3), the honeycomb-segment aggregate 1A is directly fired (Step S8 in FIG. 3).

It is preferable to perform calcination before firing to remove the binder and the like. The calcination is preferably performed at 400 to 500° C. for 0.5 to 20 hours in the ambient atmosphere. A method for calcination or firing (main firing) is not limited especially, and they may be performed using an electric furnace, a gas furnace, or the like. As the firing (main firing) conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired shape of the heat/acoustic wave conversion component 1, the circumferential part or the length of the honeycomb-segment aggregate 1A after firing is cut as needed to correct the shape. After cutting, a circumferential wall 13 (see FIG. 2) may be formed as needed. Herein, the material of the circumferential wall used may be the same material as that of the bonding material as described above. Alternatively a material that has been conventionally used for the outer coating material may be used. If there is no need to cut the circumferential part of the honeycomb-segment aggregate after firing, a bonding material may be applied to the circumferential part to form a circumferential wall after the drying as stated above and before the firing. In this case, the bonding material at the circumferential part also can be fired together in the firing as stated above, whereby the strength can be improved.

Through these steps, the heat/acoustic wave conversion component 1 is finally completed.

EXAMPLES

The following describes the present invention more specifically by way of examples, and the present invention is by no means limited to these examples.

Example 1

A heat/acoustic wave conversion component of Example 1 was manufactured as follows.

Cordierite forming raw material was used as the ceramic raw material, and 1 part by mass of pore former, 6 parts by mass of organic binder, and 0.5 parts by mass of dispersing agent were added with their dispersing mediums to 100 parts by mass of the cordierite forming raw material, followed by mixing and kneading to prepare a kneaded material.

The cordierite forming raw material used included 38.9 parts by mass of talc of 3 μm in average particle size, 40.7 parts by mass of kaolin of 1 μm in average particle size, 5.9 parts by mass of alumina of 0.3 μm in average particle size, and 11.5 parts by mass of boehmite of 0.5 μm in average particle size. Herein the average particle size refers to a median diameter (d50) in the particle distribution of each raw material.

Water was used as the dispersing medium. Herein, the amount of water was adjusted so that the water amount in the kneaded material was 35 mass %.

Hydroxypropylmethylcellulose was used as the organic binder. Ethylene glycol was used as the dispersing agent.

Next, the obtained kneaded material was extruded using a die, so that a plurality of honeycomb-segment formed bodies having a quadrangular-pillar shape as the entire shape was manufactured, in which the cells had a quadrangular shape that was close to a square, and the honeycomb-segment formed body had an upper face and a bottom face that was close to a square in shape of 23 mm in one side.

During this extrusion, prior to the extrusion using a regular die corresponding to the heat/acoustic wave conversion component of Example 1, the kneaded material was extruded using a dummy die of about 0.07 mm in rib thickness as stated above. Then, using the kneaded material after the extrusion using this dummy die, extrusion using the real die was executed.

Next, bonding-material slurry prepared by making the kneaded material as stated above into a slurry form (specifically slurry containing 20 mass % of a kneaded-material solid component of the kneaded material as stated above) was applied to the side faces of each honeycomb-segment formed body, and a honeycomb-segment aggregate made up of a set of honeycomb-segment formed bodies of 3×3=9 lengthwise and crosswise as shown in FIG. 2 was formed.

Next, in a similar manner to FIG. 7, two of the side faces of the honeycomb-segment aggregate were brought into contact with the floors of the mount, and a press treatment with a contact pressure of 0.007 kg/cm$^2$ was performed to the remaining two side faces by the pressurizing members each having the flat-shaped pressurization part to shape the honeycomb-segment aggregate. The honeycomb-segment aggregate after shaping had a quadrangular-pillar shape having an upper face and a bottom face that were close to a square of 70 mm in one side.

Herein the duration required from the preparation of the kneaded material to the shaping of the honeycomb-segment aggregate was very short within 1 hour, and these steps were performed in a room at ambient temperatures. Therefore drying was hardly advanced in each honeycomb-segment formed body in the honeycomb-segment aggregate after shaping, and the water amount thereof was considered to be almost the same as 35 mass % that was during the preparation. Actually, the mass of each honeycomb-segment formed body immediately after shaping and the overall mass of the bonding-material slurry used at each step was found, and the sum of them was compared with the mass of the honeycomb-segment aggregate 1A after the press treatment. As a result, a difference in mass was almost zero. Note here that the overall mass of the used bonding-material slurry was obtained by subtracting the mass of the entire bonding-material slurry that was not used and left, from the overall mass of the prepared bonding-material slurry.

This honeycomb-segment aggregate was dried by a microwave dryer, and then was dried completely by a hot-air dryer. Then, the honeycomb-segment aggregate after drying was checked visually as to whether there was a gap between the plurality of honeycomb-segment formed bodies making up this honeycomb-segment aggregate or not. No apparent gaps were found because of the press treatment, but a partial fine gap was found, which was generated after drying, and such a fine gap was corrected by inserting the bonding-material slurry. Both end faces of the honeycomb-segment aggregate after correction were cut so as to adjust the length, and the honeycomb-segment aggregate after cutting was dried by a hot-air dryer mainly on the cut faces.

Finally firing was performed under the temperature environment at 1,445° C. for 5 hours. After firing, the honeycomb-segment aggregate had a quadrangular-pillar shape having an upper face and a bottom face that were close to a square of 68 mm in one side. The circumferential part of the honeycomb formed body after firing was cut as needed to correct the shape to be a round-pillar shape of 59 mm in diameter. Then, an outer coating material was applied to the circumferential face of the honeycomb formed body after cutting, followed by drying, whereby a circumferential wall was formed to have the outer diameter of 60 mm. Herein, the outer coating material was slurry prepared by adding organic binder, foamable resin and dispersing agent to a raw material including cordierite particles and silica sol, to which water was added and kneaded. As a method for applying the outer coating material, the coating material was coated with a rubber spatula, for example, while rotating the honeycomb formed body after cutting on a wheel.

Through these steps, a heat/acoustic wave conversion component was completed.

In the completed heat/acoustic wave conversion component, each cell was a square having approximately the same size, and the cells were arranged regularly with a similar period on the end face of each honeycomb segment. The cell density of each honeycomb segment in the plane perpendicular to (perpendicular plane) the penetrating direction of the cells was 775 [cells/cm$^2$].

Herein, the cell density of each honeycomb segment was obtained by taking an enlarged photo of the cross section of the heat/acoustic wave conversion component in the above-stated perpendicular plane, calculating the cell density for each honeycomb segment, and finding the arithmetic average of all of the honeycomb segments. Specifically in the cross-sectional area of each honeycomb segment including the cells densely of the enlarged photo of the cross section, a region of 1 cm$^2$ was selected firstly for each of the honeycomb segments. Then, the number of the cells in each region was counted, and then the value of the arithmetic average of the cell number for all of the honeycomb segments was calculated.

Herein, when each cell is a square, the hydraulic diameter HD of each cell is equal to the length of one side of the square based on the definition (HD=4×S/C, where S denotes the cross-sectional area of the cell and C denotes the perimeter of this section). In this case, since the relational expression of cell density (cells/cm$^2$)×(HD)$^2$≤1 holds in general, when the cell density is 620 [cells/cm$^2$] or more, HD≤(1/620 [cells/cm$^2$])$^{1/2}$≈0.0401 cm holds. That is, if the cell density is 620 [cells/cm$^2$] or more, the hydraulic diameter HD of each cell will be approximately 0.4 mm or less. Such a relationship between the cell density and the hydraulic diameter holds only in the special case where the cells are squares of the same size, and in general the cell density and the hydraulic diameter HD of each cell are mutually independent parameters.

The cell density of Example 1 was 775 [cells/cm$^2$] as stated above, which was 620 [cells/cm$^2$] or more, and therefore the hydraulic diameter HD of each cell also was 0.4 mm or less.

Further, the open frontal area of the cross section of each honeycomb segment and the open frontal area of the cross section of the heat/acoustic wave conversion component as a whole were obtained based on the enlarged photo of the cross section as stated above, and the ratio of the open frontal area in the cross section of the heat/acoustic wave conversion component as a whole to the open frontal area in the cross section of each honeycomb segment was calculated. The minimum value of these ratios obtained was 0.98.

Herein the open frontal area was obtained by, from the enlarged photo of the cross section as stated above, obtaining the material-part area S1 and the gap-part area S2 for both of the cross section of each honeycomb segment and the cross section of the heat/acoustic wave conversion component as a whole, and as S2/(S1+S2) based on S1 and S2. Since the bonding material used was the same material as that of the partition walls in a slurry form, a boundary in the cross section of the honeycomb segment may not be clear. In that case, a minimum area including the cells arranged along the outer circumference of the honeycomb segment was considered roughly as the area of the honeycomb segment in cross section, and the open frontal area was obtained. Note that since the end face of the heat/acoustic wave conversion component is substantially perpendicular to the penetrating direction of the cells, the open frontal area in the cross section as stated above can be considered as the open frontal area of the heat/acoustic wave conversion component in the end face.

Further, deformation of the cell shapes of the heat/acoustic wave conversion component of Example 1 was observed in the enlarged photo of the cross section, whereby the degree of buckling distortion of the partition walls, which was generated due to shaping by the press treatment as stated above, was evaluated at two levels including "practically no problems" and "practically problems".

Further, the heat/acoustic wave conversion efficiency of the heat/acoustic wave conversion component of Example 1 was obtained by the following experiment.

The heat/acoustic wave conversion component of Example 1 was placed in a transmission tube in a similar manner to the configuration of FIG. 1, and a high-temperature side heat exchanger and a low-temperature side heat exchanger were attached to the both ends. Herein, although not illustrated in FIG. 1, a straight closed-tube was used as the transmission tube, and a microphone was connected to the forward end of the transmission tube in the traveling direction of acoustic waves (see thick arrow in FIG. 1). As the high-temperature side heat exchanger, a heat exchanger configured to receive the inflow of exhaust gas from an automobile at about 500° C. and keep the temperature of the end face of the heat/acoustic wave conversion component on the high-temperature side heat exchanger side at approximately 500° C., was used. For such a heat exchanger, the one described in Patent Document 1, for example, can be used. As the low-temperature side heat exchanger, a heat exchanger having a mesh-laminated structure including a plurality of copper mesh plates overlapped that is configured to exchange heat with air and keep the temperature of the end face of the heat/acoustic wave conversion component on the low-temperature side heat exchanger side at approximately 60° C., was used. The configuration of such a heat exchanger is conventionally well known. As the working fluid, helium gas at 10 atm was used.

In such an experimental system, exhaust gas of an automobile at about 500° C. was allowed to flow into the high-temperature side heat exchanger for 10 minutes, and the temperature of the exhaust gas flowing out from the high-temperature side heat exchanger whose temperature fell to some extent was measured. Based on a temperature change at this time, the amount of heat flowing into this experimental system was calculated. The electricity obtained through the microphone as stated above was measured based on the acoustic-wave energy generated from a thermoacoustic effect due to the temperature difference between the both ends of the heat/acoustic wave conversion component. Then, the measurement value of the electricity was divided by the energy conversion efficiency (efficiency to convert acoustic-wave energy into electric power) of the microphone known beforehand, whereby an estimated value of acoustic-wave energy was obtained. Then, based on this estimated value of acoustic-wave energy and the amount of heat flowing into the power generation system as stated above, energy conversion efficiency from heat to acoustic-wave energy was obtained.

Then, the results of the minimum value of the ratios of the open frontal area, the degree of buckling distortion and the energy conversion efficiency were evaluated in a comprehensive manner. This comprehensive evaluation was made based on the two levels including "practically sufficient" and "practically not-sufficient".

Example 2, Example 3, Comparative Example 1 and Comparative Example 2

Heat/acoustic wave conversion components were manufactured by manufacturing methods of Example 2, Example 3, Comparative Example 1 and Comparative Example 2 that were different from the manufacturing method of Example 1 as stated above only in that the die for extrusion corresponded to different values of cell density. That is, in these Example 2, Example 3, Comparative Example 1 and Comparative Example 2, the water amount of each honeycomb-segment formed body was 35 mass % that was the same as in Example 1, and the contact pressure during pressurization also was 0.007 k g/cm$^2$ that was the same as in Example 1. The thickness of the partition walls was common to these Example 2, Example 3, Comparative Example 1 and Comparative Example 2.

Then, similarly to Example 1, the minimum value of the ratios of the open frontal area, the degree of buckling distortion and the energy conversion efficiency were obtained for the heat/acoustic wave conversion components manufactured by manufacturing methods of Example 2, Example 3, Comparative Example 1 and Comparative Example 2. Then comprehensive evaluation similar to Example 1 was made thereto.

The following Table 1 shows the results of Example 1, Example 2, Example 3, Comparative Example 1 and Comparative Example 2 as stated above as well as the values of the parameters.

TABLE 1

| | Cell density (cells/cm²) | Minimum value of (overall open frontal area/segment open frontal area) | Degree of buckling distortion at partition wall | Energy conversion efficiency (%) | Comprehensive evaluation (practicality) |
|---|---|---|---|---|---|
| Ex. 1 | 775 | 0.98 | practically no problem | 35 | sufficient |
| Ex. 2 | 620 | 0.98 | practically no problem | 30 | sufficient |
| Ex. 3 | 930 | 0.98 | practically no problem | 36 | sufficient |
| Comp. Ex. 1 | 186 | 0.99 | practically problem | 5 | not-sufficient |
| Comp. Ex. 2 | 600 | 0.99 | practically no problem | 15 | not-sufficient |

As is found from a comparison in Table 1 between Example 1, Example 2, and Example 3 having the cell density of 620 [cells/cm²] or more and Comparative Example 1 and Comparative Example 2 having the cell density less than 620 [cells/cm²], Example 1, Example 2, and Example 3 show sufficiently high energy conversion efficiency as compared with Comparative Example 1 and Comparative Example 2. Especially, buckling distortion of the partition walls due to the press treatment in Comparative Example 1 cannot be ignored because it has small cell density (evaluated as "practically problems"). On the contrary, buckling distortion of the partition walls in Example 1, Example 2 and Example 3 had no problem (evaluated as "practically no problems").

In view of these results, the comprehensive evaluations on Comparative Example 1 and Comparative Example 2 were "practically not-sufficient", whereas the comprehensive evaluations on Example 1, Example 2 and Example 3 resulted in "practically sufficient". This shows that cell density of 620 [cells/cm²] or more leads to a large thermoacoustic effect, and is necessary to realize durability against a large contact pressure during the press treatment.

Examples 4 to 6 and Comparative Example 3

Heat/acoustic wave conversion components were manufactured by manufacturing methods of Examples 4 to 6 and Comparative Example 3 that were different from the manufacturing method of Example 1 as stated above only in that the water amount in the kneaded material. That is, in these Examples 4 to 6 and Comparative Example 3, the cell density of each honeycomb segment was 775 [cells/cm²] that was the same as in Example 1, and the contact pressure during pressurization also was 0.007 kg/cm² that was the same as in Example 1.

Then, similarly to Example 1, the minimum value of the ratios of the open frontal area, the degree of buckling distortion and the energy conversion efficiency were obtained for the heat/acoustic wave conversion components manufactured by manufacturing methods of these Examples 4 to 6 and Comparative Example 3. Then comprehensive evaluation similar to Example 1 was made thereto.

The following Table 2 shows the results of Examples 4 to 6 and Comparative Example 3 as stated above as well as the values of the parameters.

TABLE 2

| | Water amount (mass %) | Minimum value of (overall open frontal area/segment open frontal area) | Degree of buckling distortion at partition wall | Energy conversion efficiency (%) | Comprehensive evaluation (practicality) |
|---|---|---|---|---|---|
| Ex. 4 | 43 | 0.99 | practically no problem | 35 | sufficient |
| Ex. 5 | 41 | 0.99 | practically no problem | 35 | sufficient |
| Ex. 6 | 30 | 0.97 | practically no problem | 35 | sufficient |
| Comp. Ex. 3 | 28 | 0.95 | practically no problem | 28 | not-sufficient |

As is found from a comparison in Table 2 between Examples 4 to 6 having the water amount in the kneaded material of 30 mass % or more and Comparative Example 3 having the water amount in the kneaded material less than 30 mass %, Examples 4 to 6 show sufficiently high energy conversion efficiency as compared with Comparative Example 3. Actually, in Comparative Example 3, since the water amount in the kneaded material was small, deformation of the honeycomb-segment formed bodies was not corrected enough during the press treatment, and so the bonding layer had to be made thicker. As a result, the ratio of the open frontal area of this example was much smaller than those of Examples 4 to 6. Presumably this caused low energy conversion efficiency of Comparative Example 3.

In view of these results, the comprehensive evaluation on Comparative Example 3 were "practically not-sufficient", whereas the comprehensive evaluations on Examples 4 to 6 resulted in "practically sufficient". This shows that water amount in the kneaded material of 30 mass % or more is necessary to realize a large thermoacoustic effect.

Examples 7 to 10 and Comparative Example 4

Heat/acoustic wave conversion components were manufactured by manufacturing methods of Examples 7 to 10 and Comparative Example 4 that were different from the manufacturing method of Example 1 as stated above only in that the contact pressure used for the press treatment. That is, in these Examples 7 to 10 and Comparative Example 4, the cell density of each honeycomb segment was 775 [cells/cm²] that was the same as in Example 1, and the water amount of each honeycomb-segment formed body was 35 mass % that was the same as in Example 1.

Then, similarly to Example 1, the minimum value of the ratios of the open frontal area, the degree of buckling distortion and the energy conversion efficiency were obtained for the heat/acoustic wave conversion components manufactured by manufacturing methods of Examples 7 to 10 and Comparative Example 4. Then comprehensive evaluation similar to Example 1 was made thereto.

The following Table 3 shows the results of Examples 7 to 10 and Comparative Example 4 as stated above as well as the values of the parameters.

TABLE 3

|  | Contact pressure (kg/cm$^2$) | Minimum value of (overall open frontal area/segment open frontal area) | Degree of buckling distortion at partition wall | Energy conversion efficiency (%) | Comprehensive evaluation (practicality) |
| --- | --- | --- | --- | --- | --- |
| Ex. 7 | 0.005 | 0.97 | practically no problem | 35 | sufficient |
| Ex. 8 | 0.01 | 0.99 | practically no problem | 35 | sufficient |
| Ex. 9 | 0.05 | 0.99 | practically no problem | 35 | sufficient |
| Comp. Ex. 4 | 0.004 | 0.96 | practically no problem | 29 | not-sufficient |
| Ex. 10 | 0.06 | 0.99 | practically problem | 10 | not-sufficient |

As is found from a comparison in Table 3 between Examples 7 to 9 having the contact pressure used for the press treatment of 0.005 kg/cm$^2$ or more and Comparative Example 4 having the contact pressure used for the press treatment less than 0.005 kg/cm$^2$, Examples 7 to 9 show sufficiently high energy conversion efficiency as compared with Comparative Example 4. Actually, in Comparative Example 4, since the contact pressure used for the press treatment was small, deformation of the honeycomb-segment formed bodies was not corrected enough, and so the bonding layer had to be made thicker. As a result, the ratio of the open frontal area of this example was much smaller than those of Examples 4 to 6. Presumably this caused low energy conversion efficiency of Comparative Example 4.

As is found from a comparison in Table 3 between Examples 7 to 9 having the contact pressure used for the press treatment of 0.05 kg/cm$^2$ or less and Example 10 having the contact pressure used for the press treatment exceeding 0.05 kg/cm$^2$, buckling distortion of the partition walls in Example 10 due to the press treatment cannot be ignored because the contact pressure used for the press treatment was too large (evaluated as "practically problems"). On the contrary, buckling distortion of the partition walls in Examples 7 to 9 had no problem (evaluated as "practically no problems"). That is, even a honeycomb-segment formed body having high cell density of 775 [cells/cm$^2$] does not have enough durability for the contact pressure exceeding 0.05 kg/cm$^2$.

In view of these results, the comprehensive evaluations on Comparative Example 4 and Example 10 were "practically not-sufficient", whereas the comprehensive evaluations on Examples 7 to 9 resulted in "practically sufficient". This shows that the contact pressure used for the press treatment of 0.005 kg/cm$^2$ or more is necessary to realize a large thermoacoustic effect, but the contact pressure of 0.05 kg/cm$^2$ or less is preferable at least for cell density of 775 [cells/cm$^2$] or less.

The present invention is effective to achieve a high thermoacoustic effect in a segmented-structured heat/acoustic wave conversion component.

DESCRIPTION OF REFERENCE NUMERALS

1: heat/acoustic wave conversion component
1A: honeycomb-segment aggregate
2: high-temperature side heat exchanger
3: low-temperature side heat exchanger
4: transmission tube
5: pressurizing member
6: mount
11: partition wall
12: bonding layer
12A: bonding material
13: circumferential wall
14: cell
15: honeycomb segment
15A: honeycomb-segment formed body
100: heat/acoustic wave conversion unit

What is claimed is:

1. A method for manufacturing a honeycomb structure including a plurality of honeycomb segments, each honeycomb segment having a partition wall that defines a plurality of cells, comprising:
   a formed body forming step of monolithically forming each of a plurality of honeycomb-segment formed bodies, each honeycomb-segment formed body having a partition wall to define a plurality of cells extending from a first end face as one end face to a second end face as an opposing end face, by extruding a kneaded material into a honeycomb shape;
   an aggregate formation step of forming a honeycomb-segment aggregate by applying a fluid bonding material to side faces of the plurality of honeycomb-segment formed bodies formed in the formed body forming step, and arranging the plurality of honeycomb-segment formed bodies so that the side faces are brought into contact with each other;
   an aggregate shaping step of shaping the honeycomb-segment aggregate by performing a press treatment to side faces of the honeycomb-segment aggregate formed in the aggregate formation step; and
   a drying/firing step of drying and firing the honeycomb-segment aggregate shaped in the aggregate shaping step, wherein
   the plurality of honeycomb-segment formed bodies formed in the formed body forming step has a water amount of 30 mass % or more, the aggregate formation step and the aggregate shaping step are performed to form and shape the honeycomb-segment aggregate while keeping the water amount of each of the honeycomb-segment formed bodies at 30 mass % or more, each of the honeycomb segments making up the honeycomb structure has cell density in a cross section perpendicular to an extending direction of the plurality of cells that is 620 cells/cm$^2$ or more, and in the aggregate shaping step, the press treatment is performed to the side faces of the honeycomb-segment aggregate with a contact pressure of 0.005 kg/cm$^2$ or more.

2. The method for manufacturing a honeycomb structure according to claim 1, wherein in the aggregate shaping step, a press treatment is performed to the side faces of the honeycomb-segment aggregate with a contact pressure of 0.005 kg/cm² to 0.05 kg/cm².

3. The method for manufacturing a honeycomb structure according to claim 2, wherein a ratio of an open frontal area in the cross section in a plane perpendicular to the extending direction of the plurality of cells of the honeycomb structure as a whole to an open frontal area in the cross section in a plane perpendicular to the extending direction of the plurality of cells of each of the plurality of honeycomb segments is 0.97% or more.

4. The method for manufacturing a honeycomb structure according to claim 3, wherein the drying/firing step includes, after drying of the honeycomb-segment aggregate shaped in the aggregate shaping step and before firing, determining presence or non-presence of a gap between the plurality of honeycomb-segment formed bodies making up the honeycomb-segment aggregate after drying, and if it is determined that a gap is present, inserting the bonding material into the gap to correct the gap, and then firing the honeycomb-segment aggregate.

5. The method for manufacturing a honeycomb structure according to claim 4, wherein a hydraulic diameter HD of each cell in each of the plurality of the honeycomb segments is 0.4 mm or less, where the hydraulic diameter HD is defined as HD=4×S/C, where S denotes an area of a cross section of each cell in a plane perpendicular to the extending direction of the cells and C denotes a perimeter of the cross section.

6. The method for manufacturing a honeycomb structure according to claim 5, wherein the formed body forming step includes forming the plurality of honeycomb-segment formed bodies by extruding a kneaded material using a first die having a slit width of 0.04 mm or more and 0.09 mm or less, and extruding the extruded kneaded material into a honeycomb shape using a second die having a slit having a shape corresponding to a shape of the partition wall of each of the plurality of honeycomb-segment formed bodies.

7. The method for manufacturing a honeycomb structure according to claim 6, wherein the bonding material applied in the aggregate formation step is prepared by making a material including the same material as that of the kneaded material that is used for the extrusion of the plurality of honeycomb-segment formed bodies in the formed body forming step, into a slurry form.

8. The method for manufacturing a honeycomb structure according to claim 7, wherein the plurality of honeycomb segments are made of cordierite.

9. The method for manufacturing a honeycomb structure according to claim 8, wherein each of the plurality of honeycomb segments has a cross sectional area in a plane perpendicular to the extending direction of the plurality of cells that is 4 cm² or more and 50 cm² or less, and the honeycomb structure as a whole has a cross sectional area in the plane that is 25 cm² or more and 1,600 cm² or less.

10. The method for manufacturing a honeycomb structure according to claim 1, wherein a ratio of an open frontal area in the cross section in a plane perpendicular to the extending direction of the plurality of cells of the honeycomb structure as a whole to an open frontal area in the cross section in a plane perpendicular to the extending direction of the plurality of cells of each of the plurality of honeycomb segments is 0.97% or more.

11. The method for manufacturing a honeycomb structure according to claim 1, wherein the drying/firing step includes, after drying of the honeycomb-segment aggregate shaped in the aggregate shaping step and before firing, determining presence or non-presence of a gap between the plurality of honeycomb-segment formed bodies making up the honeycomb-segment aggregate after drying, and if it is determined that a gap is present, inserting the bonding material into the gap to correct the gap, and then firing the honeycomb-segment aggregate.

12. The method for manufacturing a honeycomb structure according to claim 1, wherein a hydraulic diameter HD of each cell in each of the plurality of the honeycomb segments is 0.4 mm or less, where the hydraulic diameter HD is defined as HD=4×S/C, where S denotes an area of a cross section of each cell in a plane perpendicular to the extending direction of the cells and C denotes a perimeter of the cross section.

13. The method for manufacturing a honeycomb structure according to claim 12, wherein the formed body forming step includes forming the plurality of honeycomb-segment formed bodies by extruding a kneaded material using a first die having a slit width of 0.04 mm or more and 0.09 mm or less, and extruding the extruded kneaded material into a honeycomb shape using a second die having a slit having a shape corresponding to a shape of the partition wall of each of the plurality of honeycomb-segment formed bodies.

14. The method for manufacturing a honeycomb structure according to claim 1, wherein the bonding material applied in the aggregate formation step is prepared by making a material including the same material as that of the kneaded material that is used for the extrusion of the plurality of honeycomb-segment formed bodies in the formed body forming step, into a slurry form.

15. The method for manufacturing a honeycomb structure according to claim 1, wherein the plurality of honeycomb segments are made of cordierite.

16. The method for manufacturing a honeycomb structure according to claim 1, wherein each of the plurality of honeycomb segments has a cross sectional area in a plane perpendicular to the extending direction of the plurality of cells that is 4 cm² or more and 50 cm² or less, and the honeycomb structure as a whole has a cross sectional area in the plane that is 25 cm² or more and 1,600 cm² or less.

* * * * *